Aug. 11, 1931.  S. A. GILES  1,818,846
METHOD OF RECOVERING GOLD AND SILVER
Filed Nov. 22, 1929
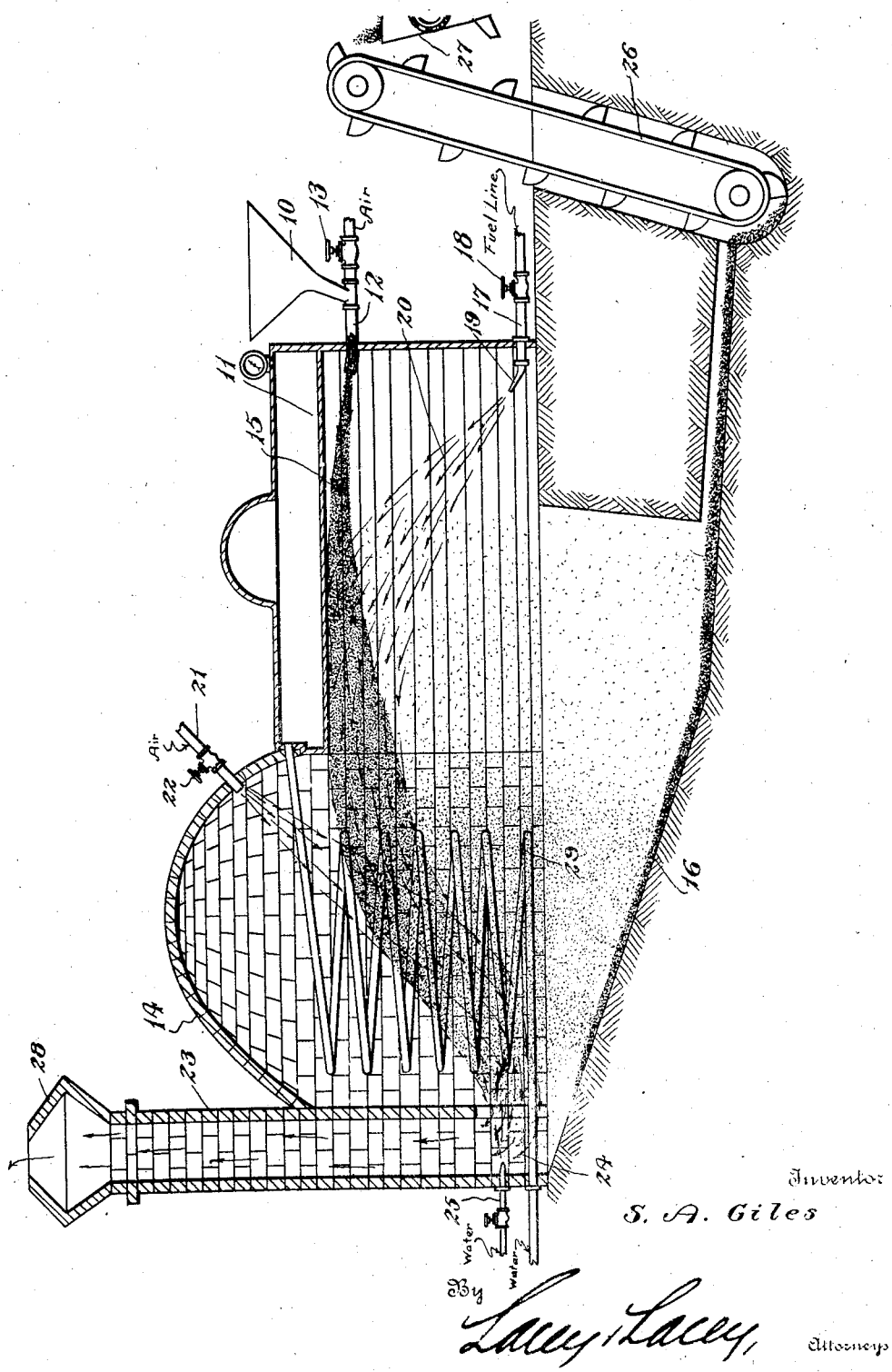
Inventor
S. A. Giles
By Lacey & Lacey, Attorneys Patented Aug. 11, 1931

1,818,846

UNITED STATES PATENT OFFICE

STELLE A. GILES, OF HUTCHINSON, KANSAS

METHOD OF RECOVERING GOLD AND SILVER

Application filed November 22, 1929. Serial No. 409,126.

This invention relates to gold and silver recovery processes and has for an object to provide a process which will effect the removal of limiting elements that present ordinary methods of recovery such as the cyanide, chlorine or amalgamation process from being effective in recovering gold and silver from low grade ores.

A further object is to produce a process which will loosen the gold from the gangue in a simple inexpensive manner and without the use of expensive equipment.

The method which is the subject matter of the present invention applies generally to the recovery of that type of gold known as colloidal gold, that is, floating gold or flake gold, this type of gold being highly elusive and too tightly sealed in the gangue or ore containing it to be recovered by the usual gold recovery methods. The gangue of waste matter in which colloidal gold is sealed usually consists of silica, sulphur, carbon, phosphorus, nitrogen, arsenic and the like and these materials are known as the limiting elements which have hitherto rendered the recovery of the gold from low grade ores such as shales and the like which cover a great portion of the surface of the earth, unprofitable and impractical.

The present invention provides a method of removing some of these limiting elements by oxidation and simultaneously loosening or cracking the gangue to free the gold flakes for recovery.

I have found that colloidal gold can be profitably recovered from various low grade ores, particularly shales, sands, etc. and for the purpose of the present invention, the recovery of colloidal gold from shales laid down in salt water such as the well known Benton shales found in Kansas and the red shales found in the Western States of the United States, will be described.

In carrying out the invention a specific example will be given it being understood that modifications may be resorted to within the scope of the appended claim to accomodate the process to the various grades or types of material to be treated. To facilitate a clear understanding of the process reference may be had to the accompanying drawing in which the figure is a longitudinal sectional view through the apparatus.

In carrying out the invention I first grind or pulverize the colloidal gold bearing shale to pass through a 60 mesh or a finer mesh. This grinding may be accomplished in the usual way and by use of the usual apparatus.

The finely ground or pulverized shale is then dumped into a hopper 10 and blown into an oxidizing chamber 11 of a water jacketed furnace by means of an air blast admitted through an inlet pipe 12 which is controlled by a valve 13. The nozzle of the pipe is directed upwardly to cause the finely pulverized material to be directed upwardly in an arched stream as shown while it passes through the oxidizing chamber 11 and into the reducing chamber 14. The material from the pulverized arched stream indicated at 15 gravitates to the bottom 16 of the furnace and while dropping is subjected to an oxidizing flame as will now be described.

A fuel pipe 17 is conducted into the furnace, the fuel preferably being oil, gas or any other desired fuel, the pipe being controlled by a valve 18. The nozzle 19 of the pipe is directed upwardly to cause the flame 20 to arch upwardly and meet the stream of finely pulverized shale and heat the latter during its passage through the furnace. The oxygen of the air blast supplies an excess of oxygen in the chamber 11 of the furnace so that the flame becomes an oxidizing flame and consumes the gaseous limiting elements such as carbon, sulphur, arsenic, phosphorus and the like contained in the shale.

This heating step is carefully controlled as to temperature so that at no time will the temperature rise sufficiently to cause melting and formation of a glass-like substance known as slag, as this would be highly detrimental to the recovery since any fluxing would cause resealing of the gold.

This initial heating step in addition to consuming the limiting elements also serves to loosen the microscopic particles of gold from the gangue of silica, lime, etc. in which it is sealed due to a difference in expansion.

The gold will expand to a far greater extent than the gangue under the same degree of heat and crack open or loosen the gangue. It has been found by experiment that a temperature of approximately 960° centigrade is preferable during this heating step. It is now clear that during this initial heating the limiting elements have been removed and have vanished from the shale being treated and also the gangue has been loosened from around the microscopic gold.

The next step in the process consists of subjecting the pulverized shale to preferably a reducing flame. In carrying out this step the stream of pulverized material is directed into the reducing chamber 14 of the furnace, in which there is a deficiency of oxygen so that the oxides of various elements which cling to the particles of gold will be removed and the flakes of gold freed. However, in certain grades of shale where the carbon is the greatest limiting feature it is desirable to supply the chamber 14 of the furnace with additional oxygen in order to effect the complete removal of the carbon and for this purpose an air inlet pipe 21 is conducted into the chamber 14 and is controlled by a valve 22.

Floating particles carried up through the stack 23 of the furnace are recovered preferably by means of a spray of water 24 which is directed into the stack through a valve controlled nozzle 25. The water carries these particles as well as the gravitated material in the furnace down along the sloping bottom 16 of the furnace and thence forwardly to a conveyor 26 the latter discharging into a grinder 27.

In some cases it will be necessary to use mechanical means 28 for removing the floating particles of ash from the stack gases. This is especially true when sulphur and arsenic are present.

The material gravitating from the arched stream in the reducing chamber 14 drops through cold water coils 29 which chill and cool the particles sufficiently to prevent the formation of slag with consequent resealing of the gold when the material accumulates on the bottom 16 of the furnace.

The final step of the process consists of regrinding the material in the grinder 27 to pass through a 200 mesh or finer mesh, the material in this condition being known as slime. This slime is then subjected to any of the usual recovery methods such as chloride, cyanide or amalgamation for the recovery of the gold therein.

It will be noted that the pulverized ore is maintained in a heated condition during its removal from the furnace and during the regrinding step for recovering the gold.

Having thus described the invention, I claim:

A method of treating colloidal gold bearing shale for recovery of the gold comprising pulverizing the shale, blowing the pulverized shale into a furnace by an air blast, heating the air laden pulverized ore stream during passage through the furnace to a temperature of approximately 960° centigrade to loosen the gold from the gangue and to simultaneously remove by oxidation the limiting elements, such as sulphur, carbon, nitrogen, arsenic, phosphorus and the like, subjecting the ore stream to the chilling effect of a water coil near the end of its path through the furnace to prevent formation of slag and prevent the resealing of the gold, during the chilling step subjecting the ore stream to a reducing flame in which there is a deficiency of oxygen to free the flakes of gold from the oxides of said limiting elements, removing the product from the furnace by a water stream to produce a slime or pulp in which the gold is free, and recovering the gold by cyanide, chloride or amalgamation treatment.

In testimony whereof I affix my signature.

STELLE A. GILES. [L. s.]